(12) United States Patent
Terno

(10) Patent No.: US 9,376,848 B2
(45) Date of Patent: Jun. 28, 2016

(54) SUPPORT BRACKET FOR SLIDING DOORS WITH SIDE LOCKING AND ADJUSTMENT

(71) Applicant: TERNO SCORREVOLI srl, Varedo (IT)

(72) Inventor: Giovanni Terno, Varedo (IT)

(73) Assignee: TERNO SCORREVOLI srl, Varedo (MB) (IT)

( * ) Notice: Subject to any disclaimer, the term of this patent is extended or adjusted under 35 U.S.C. 154(b) by 0 days.

(21) Appl. No.: 14/600,722

(22) Filed: Jan. 20, 2015

(65) Prior Publication Data

US 2015/0211275 A1    Jul. 30, 2015

(30) Foreign Application Priority Data

Jan. 28, 2014   (IT) ............................... MI2014A0106

(51) Int. Cl.
| | |
|---|---|
| A47H 15/00 | (2006.01) |
| E05D 15/00 | (2006.01) |
| E05D 15/06 | (2006.01) |
| F16M 13/02 | (2006.01) |

(52) U.S. Cl.
CPC ........ *E05D 15/0652* (2013.01); *E05D 15/0634* (2013.01); *E05D 15/0639* (2013.01); *F16M 13/02* (2013.01); *E05Y 2201/638* (2013.01); *E05Y 2600/628* (2013.01); *Y10T 16/37* (2015.01)

(58) Field of Classification Search
CPC .................. E05Y 2900/132; E05Y 2201/688; E05Y 2201/64; E05Y 2201/612; E05Y 2201/614; E05Y 2600/10; E05D 15/0626; E05D 15/063; E05D 15/0634; E05D 15/0632; E05D 15/0669; E05D 13/00; E05D 13/003
See application file for complete search history.

(56) References Cited

U.S. PATENT DOCUMENTS

| 257,401 A | * | 5/1882 | Somers | ............... E05D 15/0669 |
|---|---|---|---|---|
| | | | | 16/100 |
| 477,739 A | * | 6/1892 | Dahmer | .............. E05D 15/0634 |
| | | | | 16/105 |
| 3,283,444 A | * | 11/1966 | Andres | ............... E05D 15/0669 |
| | | | | 16/105 |

(Continued)

FOREIGN PATENT DOCUMENTS

| EP | 2243913 A1 | 10/2010 | |
|---|---|---|---|
| FR | 2659106 A3 | * 9/1991 | .......... E05D 15/0669 |

(Continued)

*Primary Examiner* — Chuck Mah
(74) *Attorney, Agent, or Firm* — Abelman, Frayne & Schwab

(57) ABSTRACT

A support bracket (10) with side locking and adjustment for sliding doors and leaves (22) is positioned and stabilized in a metal profile (14) attached with screws (26) in the cavity (18) formed along the upper edge of said doors or leaves and protrudes from the top of said profile with a threaded pin (54) designed to engage with a carriage (56) sliding in a rail (56'). The bracket comprises a body (12) of a substantially parallelepiped shape extending in a horizontal direction and with an open lower face, in the rear part of which opposite the mouth (14") of the profile (14) a slider (28) is placed, fitted at the bottom with opposite projecting and inclined lugs (34) designed to abut with corresponding inclined portions (36) made in the lower part of the opposite sides of said body (12) for moving said slider. Said latter is provided with superposed through openings (30), (32), oriented in alignment with the longitudinal axis of the body (12), which respectively house a first screw (40) partially threaded and a second screw (46), said latter being moved with respect to the slider (28) starting from a through opening (44) made at the bottom of the rear face of said body (12).

16 Claims, 3 Drawing Sheets

(56) References Cited

U.S. PATENT DOCUMENTS

| | | | | |
|---|---|---|---|---|
| 3,442,052 A * | 5/1969 | Levine | ............... | E05D 15/0669 49/425 |
| 3,996,643 A * | 12/1976 | Steigerwald | ........ | E05D 15/0669 16/99 |
| 4,278,306 A * | 7/1981 | Douglas | .............. | E05D 15/0678 384/44 |
| 4,639,970 A * | 2/1987 | Adams | .................. | E05D 15/066 16/100 |
| 5,860,189 A * | 1/1999 | An | ...................... | E05D 15/0669 16/105 |
| 6,021,547 A * | 2/2000 | Stagoll | ................ | E05D 15/0669 16/105 |
| 6,115,968 A * | 9/2000 | Sarlanis | .............. | E05D 15/0634 16/105 |
| 7,712,258 B2 * | 5/2010 | Ewing | ....................... | E05C 7/06 16/105 |
| 8,522,398 B2 * | 9/2013 | Haab | ................... | E05D 15/0634 16/102 |
| 2002/0039940 A1* | 4/2002 | Huang | ............... | E05D 15/0669 474/101 |

FOREIGN PATENT DOCUMENTS

| | | |
|---|---|---|
| JP | 2009299261 A | 12/2009 |
| WO | WO 2011100788 A1 * | 8/2011 |
| WO | WO2011161707 A1 | 12/2011 |

* cited by examiner

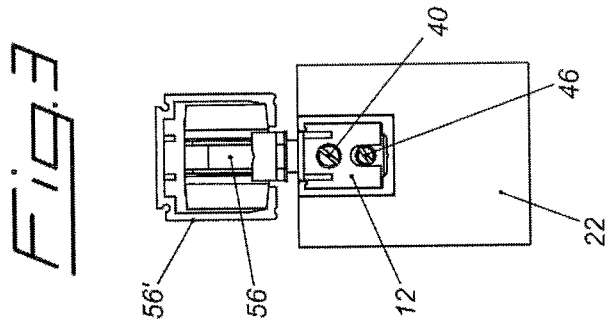
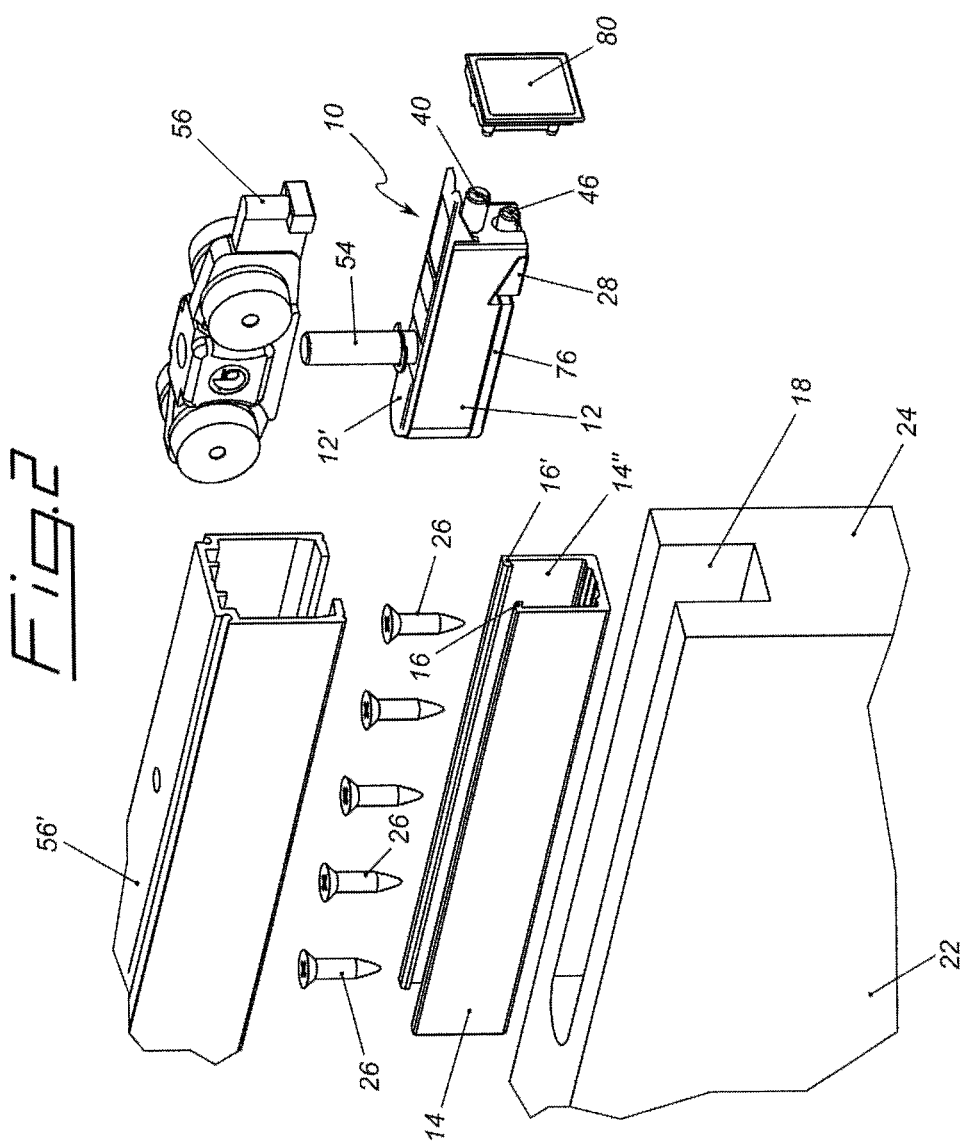

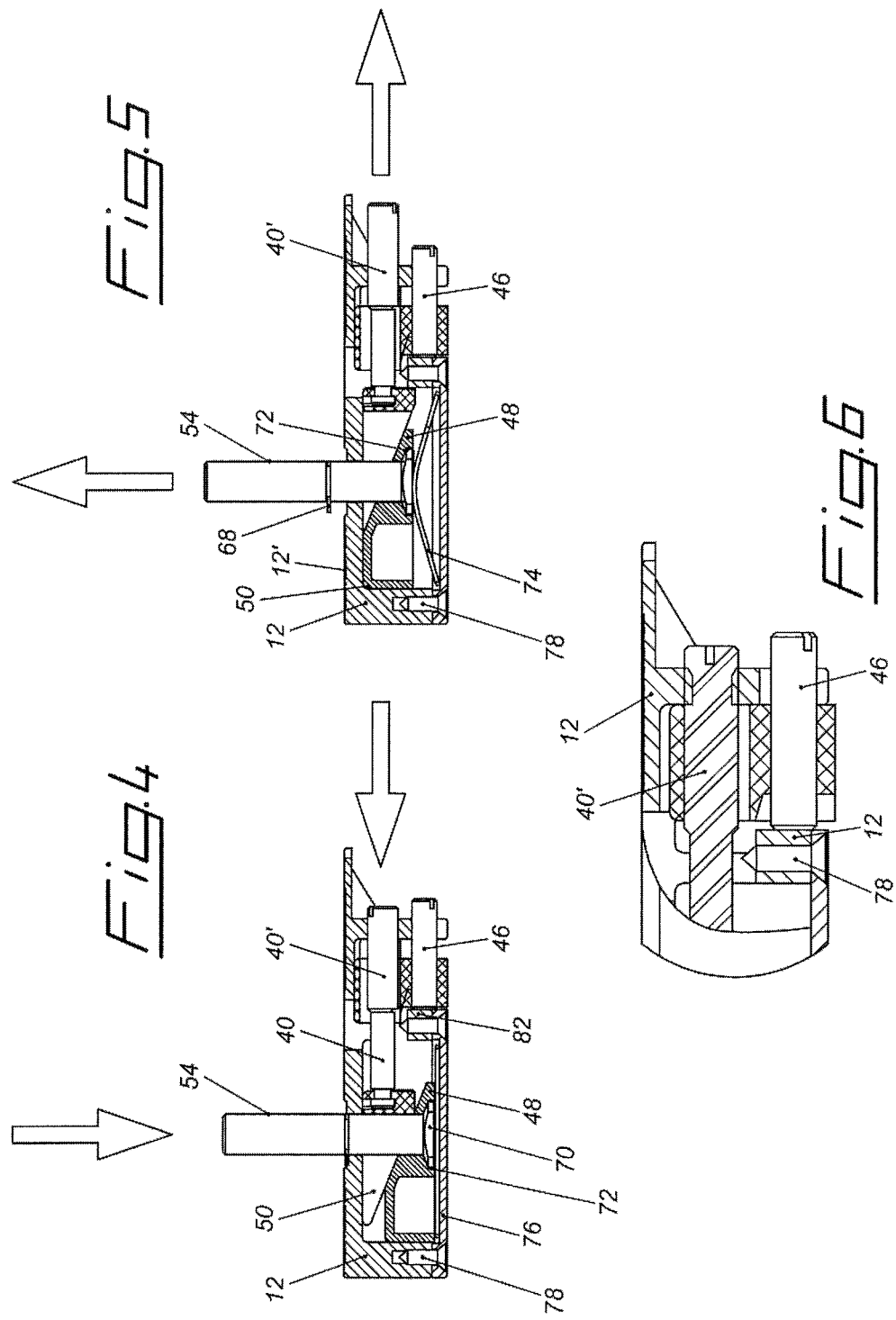

SUPPORT BRACKET FOR SLIDING DOORS WITH SIDE LOCKING AND ADJUSTMENT

CROSS-REFERENCE TO RELATED APPLICATIONS

This application claims priority to Italian Patent Application No. MI2014A000106, Filed Jan. 28, 2014, the disclosure of which is incorporated herein by reference in its entirety, and made a part of this application.

FIELD OF INVENTION

The present invention relates to a support bracket for sliding doors with side locking and adjustment.

More in particular, the present invention relates to a support bracket for sliding doors and partition panels for the separation of rooms, as well as for sliding doors of cabinets. As is known, the hanging doors and panels which divide environments, as well as the leaves of some types of furniture, are provided with carriages sliding in guide rails attached to the upper part of the frames of the doors or cabinets. The height adjustment of these hanging elements, making it possible to level them in relation to the ground or to the bottom, is performed by acting on special brackets with spanners or specific tools, which are inserted frontally in the space existing between the sliding rail and the door, panel or leaf. This frontal adjustment and subsequent locking in position of the hanging element has significant drawbacks, especially given that for aesthetic or stylistic reasons it is currently demanded that the space between the sliding rail and the hanging element be as small as possible. It should also be considered that the so-called cover veils suitable to shield said rail are no longer accepted, especially for sliding doors. Current manufacturing requirements must also be considered, according to which solutions in which the sliding doors can be placed flush with the ceiling or recessed flush with the plasterboard false ceiling are increasingly popular; in these cases too, the space existing between the rail and leaf or door must therefore be as limited in height as possible.

BACKGROUND OF THE INVENTION

From JP 2009 299261 a device suitable to regulate both in height and in the longitudinal direction a door or leaf connected to a carriage sliding in a rail is known of. Such device comprises a box, attached to the sliding door, consisting of a plurality of components connected together and provided, along the inner and outer vertical walls with multiple horizontal, vertical and oblique through cavities. By means of screws and pins which are made to slide in said cavities the movement of the sliding door is achieved to perform the adjustment required.

WO2011 161707 relates to a system for the height adjustment of a retractable sliding door, which is moved by means of carriages. Said latter are coupled to respective supports by a screw the rotation of which causes the relative movement between said elements and the consequent height adjustment of the door.

EP 2 243 913 also describes a support for sliding doors with means for height adjustment. Such means comprise a threaded element which engages with a worm screw, in turn engaged with a helical gear. By acting on the worm screw the helical gear and, consequently, the threaded element is placed in rotation; the latter, rotating, changes the positioning in height of the door.

There are also brackets with lateral adjustment, i.e. performed starting from an open face of the sliding rail, but in this case too the problem arises of the attachment using tools of said brackets in the upper part adjacent to the rail and the space between the latter and the hanging element thus remains high. According to another known solution, on one type of bracket it is possible to perform locking but not lateral adjustment; to achieve the latter it is necessary to remove the door or leaf from the relative bracket. This is, however, on the whole, a rather imprecise adjustment, now rejected by the manufacturers of sliding doors.

A further drawback which is found in relation to the sliding elements in question concerns the possible recoil incurred at the end stroke and which sometimes determines dangerous oscillations in the vertical direction and a high level of noise.

SUMMARY OF THE DISCLOSURE

The purpose of the present invention is to overcome the drawbacks complained of above.

More in particular, the purpose of the present invention is to provide a support bracket for sliding doors with side locking and adjustment which allows for easy height adjustment and locking of the door or leaf, at the same time significantly reducing the space remaining between the hanging element and the respective sliding rail.

A further purpose of the invention is to provide a bracket as defined above wherein the height adjustment and subsequent locking of the door or leaf can be achieved with lateral interventions in relation to the sliding rail, without the need however to remove the hanging element from its bracket.

A no less important purpose of the invention is to provide a support bracket suitable to prevent the recoil which the doors or leaves can suffer at the end of the stroke, thus avoiding both the subsequent oscillations and the noise.

A further purpose of the invention is to make available to users a support bracket suitable to ensure a high level of resistance and reliability over time, in addition such as to be easily and economically made. These and other purposes are achieved by the support bracket for sliding doors with side locking and adjustment of the present invention according to the main claim.

BRIEF DESCRIPTION OF THE DRAWINGS

The construction and functional characteristics of the support bracket of the present invention will be more clearly comprehensible from the description below, in which reference is made to the appended drawings which show a preferred and non-limiting embodiment and wherein:

FIG. 2 shows schematically, in an exploded view, the same bracket assembled in its components, one of the carriages with the relative sliding rail, and the same housing profile and part of one of the leaves or doors with the seat for said profile;

FIG. 3 shows schematically, in a front view, the assembly formed by the leaf or door coupled to the sliding rail of the carriage connected to the bracket of the present invention;

FIG. 4 shows schematically, in partial longitudinal cross-section, the same bracket in the adjustment step which brings the door or leaf to rise;

FIG. 5 shows schematically, in partial longitudinal cross-section, the same bracket in the adjustment step which brings the door or leaf to lower itself;

FIG. 6 is a partial enlargement of the bracket according to FIG. 5.

DETAILED DESCRIPTION OF THE INVENTION

Figure 1:
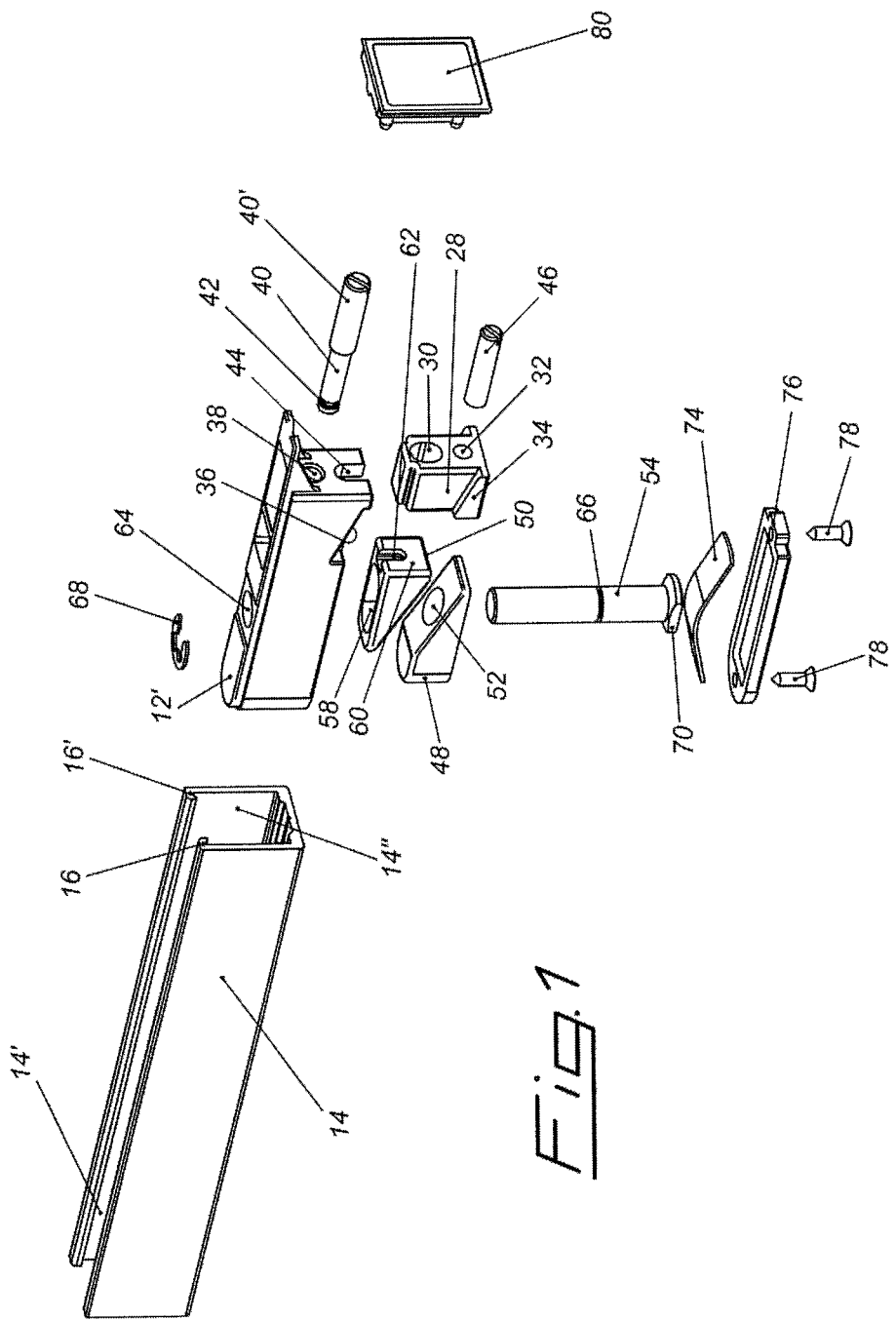
FIG. 1 shows schematically, in an exploded view, the support bracket of the present invention and its relative housing profile.

With initial reference to FIGS. 1 and 2, the support bracket of the present invention, globally denoted by reference numeral 10 in FIG. 2, comprises a body in metal 12 such as zamak or other suitable material, of a substantially parallelepiped shape extending horizontally, with the lower face open, the upper side 12' having a planar extension and the front part preferably with a convex arched profile. The bracket 10 is designed to be positioned and stabilized in a metal profile of the known type, shown schematically as reference numeral 14; said profile defines a "U" section in which the free upper end of each of the opposite vertical branches is bent at 90.degree. in the direction of the longitudinal axis and forms opposite lips 16 and 16' extending longitudinally. Said lips reduce the upper access space 14' to the cavity of the profile 14, indicated as 14". The width of the body 12 of the bracket 10 is greater than the upper space 14' of the profile 14, so that said bracket is inserted into the aforementioned profile starting from one of its open heads and is then stabilised in it by the means described below. The profile 14 is previously housed in a cavity 18 formed along the top edge 20 of the door or leaf, schematically shown as reference numeral 22 in FIG. 2; said cavity extends horizontally and reaches one of the vertical edges, indicated as 24 in the same figure, of the door or leaf 22. Although FIGS. 1 and 2 show a single bracket 10 in relation to the profile 14, is to be understood that along the top edge 20 opposite and specular cavities 18 are made for the respective profiles 14, each of which, fixed with screws 26 in the respective profile, houses a bracket 10; this in function of the need to perfectly align the door or leaf 22 with the floor or bottom of the cabinet, acting at the two opposite ends as specified below.

The attachment of each bracket in the recess 14" of the profile 14 is preferably achieved by means of a slider 28, typically in synthetic material such as reinforced nylon, consisting of a prismatic body provided with superposed and aligned openings extended horizontally 30 and 32, the latter threaded; said openings 30 and 32 are oriented in alignment with the longitudinal axis of the body 12. At the bottom of the slider 28, opposite lugs 34 project, with an inclined profile designed to abut and slide along corresponding inclined portions 36 of the body 12 of the bracket 10. In particular, the inclined portions 36 are made on said body 12 in the rear part thereof opposite the front part with the convex arched profile, at the bottom of the opposite sides. The rear wall of the body 12 opposite the front wall defines a vertical extension and presents, in a position next to the upper side 12', a threaded through hole 38 for a first screw 40, provided with an annular grooving 42 at the front end; said screw has a larger diameter in the central-rear area along which the threading is provided. Below the hole 38 and in alignment therewith a through opening 44 for a second screw 46 is made on said rear wall, having the function of stabilizing the bracket 10 in the profile 14 by means of the movement of the slider 28, as described in greater detail below. The bracket 10 further comprises a pair of lower 48 and upper wedges 50, superposed along the respective inclined surfaces. From the inclined surface of the lower wedge 48 an opening or vertical through hole 52 extends, in which a threaded pin 54 is inserted designed to engage with a carriage 56, in itself known, sliding in a conventional profile or guide rail 56'. Said latter typically presents a quadrangular cross-section and is centrally open along the underside for the passage of the threaded pin 54 which connects the bracket 10 to the carriage 56. In the upper wedge 50, the exposed upper surface defines a planar extension, being designed to abut constantly with the lower face of the upper side 12' of the body 12. The upper wedge 50 is also provided with a vertical through aperture 58 crossed by the threaded pin 54; in this case, such opening defines an ovoid shape extended in the longitudinal direction along the aforementioned wedge, starting from its flat upper face. Said wedge also comprises a vertically extending wall 60, facing in the direction of the slider 28, at the top of which a groove is made in a central position, which forms a race 62 oriented vertically. The race 62 constitutes the engagement seat of the annular grooving 42 of the first screw 40, provided with a thread in the rear part 40' of greater diameter.

The two superposed lower 48 and upper wedges 50 crossed by the threaded pin 54 are inserted from below into the body 12 and abut against the slider 28 in the part near the convex arched front face of said body. The upper side 12' of said latter is provided with a through hole 64, which allows the threaded pin 54 to protrude from the body 12 to be screwed to the carriage 56. Said pin is provided, about halfway along its extension, with a notching 66 which houses a Seeger ring 68 having the function of preventing the excessive tightening of the bracket 10, by means of a conventional nut, to the carriage 56; this way, instead, the threaded pin 54 can perform a vertical excursion, albeit limited nevertheless sufficient to move the leaf or door 22 to adjust its height. FIGS. 4 and 5 illustrate these steps and also illustrate other advantageous features of the invention. In the first place, the head 70 of the threaded pin 54 is shaped, preferably faceted, to fit precisely into a complementary seat 72 made along the bottom surface of the lower wedge 48; such seat is visible in FIGS. 4 and 5. This way it is possible to prevent the pin from freely rotating, with the risk of unscrewing itself from the carriage 56 consequently lowering the door or leaf 22 previously levelled.

Secondly, the threaded pin 54 is combined with a torsion spring 74 made of harmonic steel, typically in the form of a foil, positioned below the head 70 of the threaded pin 54 and extending longitudinally in the lower part of the body 12; said latter is closed by a cover plate 76 made of metal or other suitable material, attached to the body with screws 78 or equivalent. A further plastic cover or cap 80 closes the heads of the profile 14, shielding the respective brackets 10 inserted and stabilized therein.

In the operating step, the bracket 10 assembled in its components is inserted in the profile 14, already attached by the screws 26 in the cavity 18 of the door or leaf 22; said bracket is placed in the aforementioned profile 14 substantially flush with the mouth 14" and is stabilized therein by the second screw 46. Such latter, inserted in the cavity 18 of s the body 12 is engaged in the threaded hole 32 of the slider 28, provided with the opposite inclined lugs 34. The sliding of such lugs on the corresponding inclined portions 36 of the body 12 makes the latter rise and abut from below with the upper side 12' and the lips 16 and 16' of the profile 14. The bracket is thus stabilized. This sliding is achieved as a result of the second screw 46 being screwed fully into the threaded hole 32 of the slider 28, protruding from the opposite side of the said slider and abutting with a fixed part 82 of the body 12, as visible in FIGS. 4 and 5 and, more in particular, in FIG. 6. At the moment in which the second screw 46 screwed into the hole 32 of the slider 28 abuts said fixed part 82, the slider moves back and makes the body 12 rise until it locks in the profile 14, said screw 46 acting as a worm.

Subsequently, the height adjustment of the door or leaf 22 is realized by acting on the first screw 40, the threaded rear part 40' of which of greater diameter is engaged in the through opening 30 of the slider 28 and the annular grooving 42 of which is engaged in the race 62 of the upper wedge 50. As can be seen in particular from FIGS. 4 and 5, by loosening the screw 40 the upper wedge 48 moves back with respect to the lower wedge 48, the torsion spring 74 lifts and pushes the threaded pin 54 upwards, as shown in FIG. 5. The bracket 10 which said pin protrudes from thus receives a corresponding upward thrust and being stabilized in the profile 14 in turn fixed to the door or leaf 22, makes the latter rise to find the appropriate levelling. Conversely, as shown in FIG. 4, by tightening the screw 40 the upper wedge 48 advances, the torsion spring 74 is compressed and the threaded pin 54 is lowered, thus lowering the door or leaf 22. The presence on the upper wedge 50 of the through opening 58 of an ovoid shape allows the wedge to move with respect to said lower wedge 48 without interfering with the threaded pin 54. The torsion spring 74 also keeps such threaded pin in constant tension which, being connected to the carriage 56, prevents the door or leaf 22 from being subjected to impact and violent recoils in the vertical direction and to oscillations upon reaching the end stroke, also producing accentuated noise.

As may be seen from the above, the advantages which the invention achieves are evident.

The use of the support bracket of the present invention makes it possible to substantially reduce the space between the sliding rail of the carriages and the hanging element; the sliding partition doors of rooms, in particular, can thus be easily arranged flush with the ceiling or recessed flush with the plasterboard false ceilings. The possibility of adjusting and laterally locking the door or leaf, which can thus be easily and quickly aligned with each other and/or with the floor is particularly advantageous.

The presence of the torsion spring, in addition, contributes appreciably to preventing recoils in the vertical direction and possible oscillations of the door or leaf at the end is stroke, at the same time reducing the noise.

Despite the invention having been described above with particular reference to one of its embodiments, given solely by way of a non-limiting example, numerous modifications and variants will appear evident to a person skilled in the art in the light of the above description. The present invention therefore sets out to embrace all the modifications and variants which fall within the sphere and scope of the following claims.

LIST OF NUMERALS

10 Support Bracket
12 Body
12' Upper Side of body
14 Metal Profile
14' Upper Access Space
14" Cavity of Profile
16, 16' Opposite Lips
18 Cavity
20 Top Edge of Door or Leaf
22 Door and Leaf
24 Cavity Extending Horizontally and Reaching One of the Vertical Edges
26 Screws
28 Slider
30,32 Openings
32 Threaded Horizontal Opening
34 Opposite Projecting and Inclined Lugs
36 Corresponding Inclined Portions
38 Threaded through Hole
40 First Screw
40' Rear Part of Screw 40 of Greater Dimension
42 Annular Grooving
44 Opening for Second Screw 46
46 Second Screw
48 Lower Wedge
50 Upper Wedge
52 Through Hole
54 Threaded Pin
56 Carriage
56' Guide Rail
58 Vertical Through Aperture
60 Vertical Extending Wall
62 Race Oriented Vertically
64 Through Hole
66 Notching
68 Seeger Ring
70 Head of Threaded Pin 54
72 Complementary Seat
74 Torsion Spring
76 Cover Plate
78 Body Screws or the Equivalent
80 Plastic Cover or Cap
82 Fixed Part

The invention claimed is:

1. A support bracket (10) with side locking and adjustment for sliding doors and leaves (22), positioned and stabilised in a "U" shaped metal profile (14) which includes a pair of opposite side walls and opposite lips (16) and (16') extending at a 90° angle from distal ends of the side walls and extending longitudinally inward, wherein the profile (14) is attached with screws (26) in a cavity (18) formed along an upper edge of said doors or leaves and wherein the support bracket (10) includes an upwardly extending threaded pin (54) for engaging with a carriage (56) sliding in a rail (56'), characterised in that the support bracket (10) comprises:

a body (12) of a substantially parallelepiped shape extending in a horizontal direction with an upper side (12') and with an open lower face, a slider (28) positioned in a proximal end thereof, fitted at the bottom with opposite projecting and inclined lugs (34) for abutting with corresponding inclined portions (36) made in the lower part of the opposite sides of said body (12), said slider (28) being provided with a pair of superposed through openings (30), (32), oriented in alignment with the longitudinal axis of the body (12), which respectively house a first screw (40) partially threaded and a second screw (46);

a pair of superposed lower (48) and upper wedges (50);

wherein the support bracket (10) is stabilized in the profile (14) through the turning of the second screw (46) which in turn moves said slider (28) laterally with respect to said body (12), which in turn slides opposing surfaces of the inclined lugs (34) and the inclined portions (36) with respect to each other which in turn drives said upper side (12') of said body (12) to abut against said lips (16), (16'), and which is moved with respect to said slider (28) starting from a through opening (44) made at the bottom of a rear face of said body (12), said second screw (46) crossing the through opening (32) of said slider (28) from which the second screw (46) protrudes to abut against a fixed part (82) of said body (12);

wherein the height of the support bracket (10) with respect to the carriage (56) is adjusted by turning the first screw (40) which in turn moves said upper wedge (50) laterally with respect to said lower wedge (48) which in turn selectively moves the threaded pin (54) in a vertical direction.

2. The bracket according to claim 1, characterised in that the first screw (40) is provided with a thread in the central-rear part (40') defining the greatest diameter and presents, at the front end, an annular grooving (42).

3. The bracket according to claim 2, characterised in that the thread made along the centre-rear part (40') of the first screw (40) engages in a threaded through hole (38) made on the rear face of the body (12), above the through opening (44).

4. The bracket according to claim 3, further comprising a shielding cap (80) to be applied to the mouth (14") of the profile (14) in which said bracket is inserted and stabilized.

5. The bracket according to claim 2, further comprising a shielding cap (80) to be applied to the mouth (14") of the profile (14) in which said bracket is inserted and stabilized.

6. The bracket according to claim 1, characterised in that said two lower (48) and upper wedges (50), are superposed along the respective inclined surfaces and are arranged in the body (12) in front of the slider (28), the lower wedge (48) being provided with a through opening or hole (52) which extends vertically starting from an inclined surface thereof, in said opening the threaded pin (54) being inserted, a head (70) of which is shaped and is recessed in a complementary seat (72) created on the lower face of said lower wedge (48).

7. The bracket according to claim 6, characterised in that the upper wedge (50) is provided with a vertical through opening (58) of an ovoid shape, extending longitudinally starting from its flat upper face, for the passage of the threaded pin (54).

8. That bracket according to claim 7, characterised in that the upper wedge (50) comprises a wall extending vertically, facing the slider (28), at the top of which a race (62) is centrally formed, in which an annular groove of the first screw (40) engages.

9. The bracket according to claim 8, further comprising a shielding cap (80) to be applied to the mouth (14") of the profile (14) in which said bracket is inserted and stabilized.

10. The bracket according to claim 7, characterised in that the threaded pin (54) is provided with a notching (66) for a Seeger ring (68), said pin protruding upwardly from the body (12) through a hole (64) made along the upper side (12').

11. The bracket according to claim 10, further comprising a shielding cap (80) to be applied to the mouth (14") of the profile (14) in which said bracket is inserted and stabilized.

12. The bracket according to claim 7, further comprising a shielding cap (80) to be applied to the mouth (14") of the profile (14) in which said bracket is inserted and stabilized.

13. The bracket according to claim 6, further comprising a shielding cap (80) to be applied to the mouth (14") of the profile (14) in which said bracket is inserted and stabilized.

14. The bracket according to claim 1, further comprising:
a torsion spring (74), placed below the threaded pin (54) and extending in a longitudinal direction in the body (12), and
a cover plate (76) attached with screws (78) or equivalent to the bottom of the bracket.

15. The bracket according to claim 14, further comprising a shielding cap (80) to be applied to the mouth (14") of the profile (14) in which said bracket is inserted and stabilized.

16. The bracket according to claim 1, further comprising a shielding cap (80) to be applied to the mouth (14") of the profile (14) in which said bracket is inserted and stabilized.

* * * * *